United States Patent [19]

Haytayan

[11] 4,040,554
[45] Aug. 9, 1977

[54] PNEUMATIC APPARATUS

[76] Inventor: Harry M. Haytayan, Sunnyside Lane, Lincoln, Mass. 01773

[21] Appl. No.: 637,571

[22] Filed: Dec. 4, 1975

Related U.S. Application Data

[63] Continuation-in-part of Ser. No. 547,221, Feb. 5, 1975, abandoned, which is a continuation-in-part of Ser. No. 496,453, Aug. 12, 1974, and a continuation-in-part of Ser. No. 312,665, Dec. 6, 1972, abandoned.

[51] Int. Cl.$^2$ .............................................. B25C 1/04
[52] U.S. Cl. ........................................ 227/8; 227/130
[58] Field of Search ................................. 227/7, 8, 130

[56] References Cited

U.S. PATENT DOCUMENTS

| 2,807,021 | 9/1957 | Chellis | 227/7 |
|---|---|---|---|
| 2,989,750 | 6/1961 | McIlvin | 227/8 |
| 3,040,327 | 6/1962 | Michel | 227/130 |
| 3,464,614 | 9/1969 | Volkmann | 227/8 |
| 3,498,517 | 3/1970 | Novak | 227/8 |
| 3,822,819 | 7/1974 | Wilson | 227/130 |

Primary Examiner—Granville Y. Custer, Jr.
Attorney, Agent, or Firm—Schiller & Pandiscio

[57] ABSTRACT

An apparatus is described for driving fasteners or for other impacting applications. The apparatus comprises a cylinder, a piston slidably mounted in the cylinder, a hammer connected to the piston, an air reservoir, an air manifold or supply chamber connected to the air reservoir, a quick-acting poppet valve for rapidly admitting high pressure air on command to the upper end of the cylinder from the air reservoir, a trigger-operated control valve adapted (1) to transmit high pressure air to the poppet valve from the air manifold so as to cause the poppet valve to close off the upper end of the cylinder or (2) to exhaust high pressure air from the poppet valve so as to cause the poppet valve to open, and an exhaust control valve adapted to (1) transmit high pressure air from the air reservoir to the lower end of the cylinder so as to cause the piston to retract the hammer when the poppet valve is closed or (2) to exhaust air from the underside of the piston when the poppet valve is open and high pressure air from the air reservoir causes the piston to drive the hammer through its impact stroke. A safety mechanism is provided to control operation of the exhaust control valve and, as an optional feature, a safety mechanism may be provided to releasably lock the trigger.

43 Claims, 11 Drawing Figures

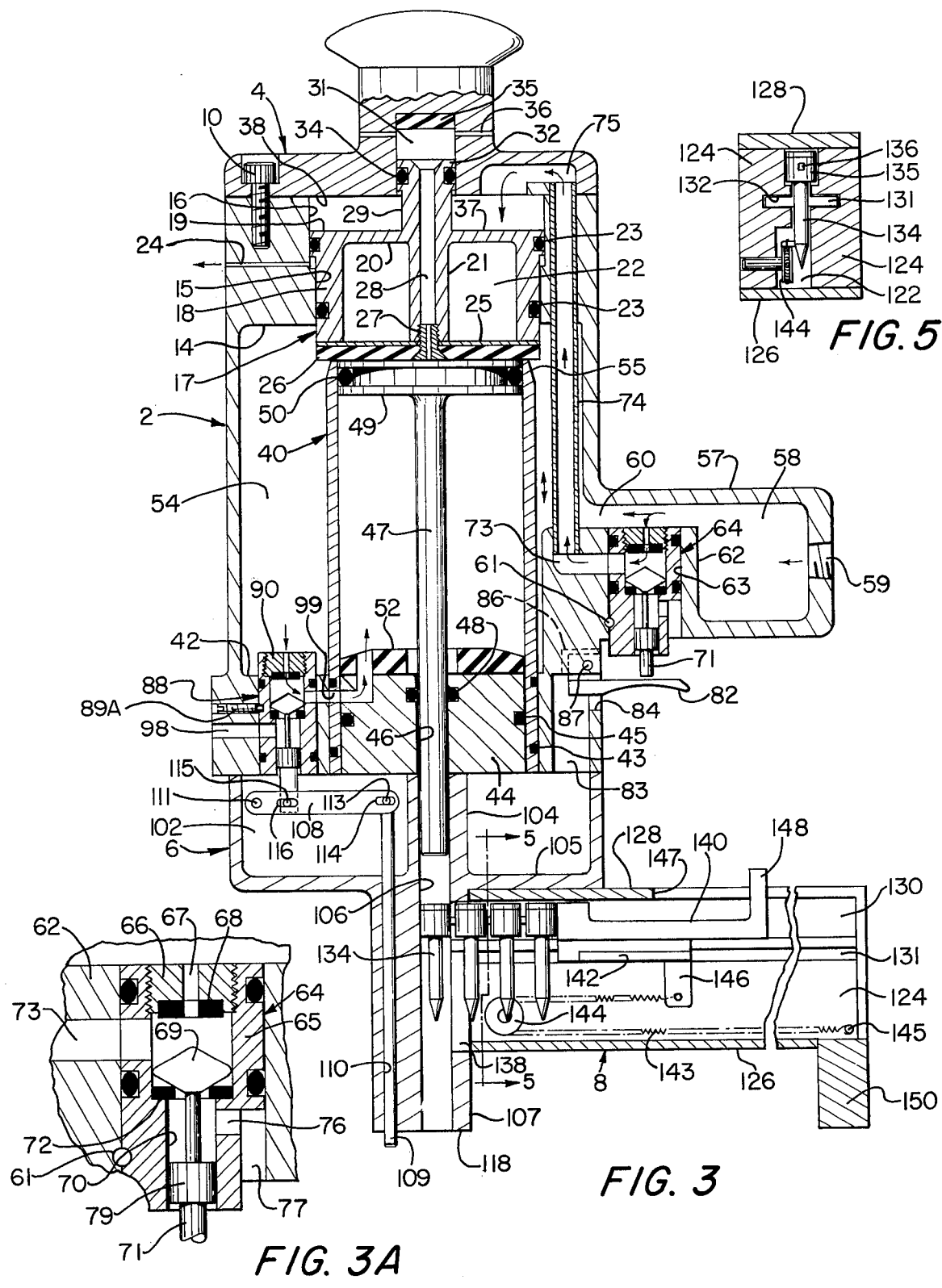

PNEUMATIC APPARATUS

RELATED APPLICATIONS

This application is a continuation-in-part of application Ser. No. 547,221, for Pneumatic Apparatus, filed by Harry M. Haytayan on Feb. 5, 1975 (now abandoned) which is a continuation-in-part of U.S. application Ser. No. 496,453 for Improvements In Fastener Driving Apparatus and Processes, filed by Harry M. Haytayan on Aug. 12, 1974, which in turn was a continuation-in-part of U.S. pat. application Ser. No. 312,665 for Improvements In Fastener Driving Apparatus and Processes filed by Harry M. Haytayan on Dec. 6, 1972 (now abandoned).

FIELD OF THE INVENTION

This invention pertains to pneumatic driving apparatus and more particularly to pneumatic fastener driving tools.

BACKGROUND OF THE INVENTION

Pneumatic nail-driving tools are old in the art and are exemplified by the devices disclosed in U.S. Pat. Nos. 3,498,517, 3,060,441, 3,035,268, 3,060,440, 3,595,460 and 3,711,008.

Prior hand-held pneumatic driving devices known to the art have not been suitable for heavy-duty fastener-driving operations, e.g., operations requiring installation of nails or fasteners to high strength substrates such as prestressed concrete having 5,000 to 10,000 psi compressive strength and structural steel plates with a thickness of 3/16th inch or greater. As a consequence, most heavy-duty fastener-driving operations are carried out with explosive-actuated devices which are time consuming and expensive and dangerous to operate. Furthermore, explosive-actuated fastener-driving means have substantial recoil and noise problems.

Prior attempts to provide pneumatic driving devices suitable for heavy-duty fastener-driving operations have been generally unsuccessful due to the difficulty of generating the required impact force to drive a nail or other fastener through high strength substrates such as concrete and steel plate. Because of the problems of generating the required acceleration, prior pneumatic driving devices designed for heavy-duty fastener-driving operations have been unduly complicated and have required complicated and large valving for feeding and exhausting the pneumatic fluid so as to generate the desired acceleration and impact force. Furthermore, most prior designs have involved a mechanical spring for assisting the driving member on its return stroke. However, the inclusion of spring means has had the undesired effect of limiting the acceleration of the driving member and the impact force exerted by such member on the fastener which is to be driven. Most hand-held prior art devices designed for pneumatically driving nails and similar fasteners have been low-energy devices, i.e., devices that provide for little or no acceleration time between the commencement of the work or driving stroke of the driving member and the impacting of the work by the fastener which is driven by the driving member. As a consequence, prior pneumatic driving devices have had to be massive in order to generate sufficient energy to accomplish heavy-duty fastener driving operations. Unfortunately, such prior driving devices also tend to have severe recoil.

The fastening device disclosed in related patent application Ser. No. 496,453 referred to above has the capability of driving fasteners, e.g., nails, into high resistant structural masses such as prestressed concrete with a compressive strength of 5000 to 8000 psi and structural steel plate with a thickness in the order of ¼ inch — a result that cannot be achieved satisfactorily with prior art pneumatic devices designed for fastener-driving operations.

SUMMARY OF THE INVENTION

The primary objective of the present invention is to improve upon the pneumatic fastener driving apparatus and processes disclosed in said copending application Ser. No. 496,453.

A more particular objective of the invention is to provide a pneumatic driving apparatus for heavy-duty fastener-driving operations which is simpler and capable of developing substantially more driving power per unit volume than prior apparatus intended for similar tasks, and which at the same time is reliable, easy to maintain and relatively inexpensive to manufacture.

A further specific objective of the invention is to provide a pneumatic driving apparatus which is designed to permit precise control of the velocity of its driving piston, thereby controlling the energy output of the unit and making a maximum use of the available energy.

Still another object is to provide a pneumatic driving apparatus which is designed so that the air power is utilized to substantially its full line pressure, and which further is characterized by a relatively small diameter, light-weight driving piston and unique valving for controlling flow of air.

Still another object is to provide a pneumatic driver that is adaptable for various impacting applications.

A further important object is to provide a pneumatic driver which utilizes relatively simple valving to achieve efficient operation.

Other objects of the invention are to provice a fluid operated driving device which utilizes a single piston for propelling the driving member, incorporates fail-safe features to prevent accidental firing and to render the unit inoperative in the event of tampering or breakdown, is incapable of firing successive shots accidentally, and operates with a minimum of noise and recoil.

Still another object is to provide a heavy-duty pneumatic driving apparatus which can be hand carried and which does not rely on any mechanical spring for its operation.

The foregoing objects, and other objects hereinafter disclosed or rendered obvious, are achieved by provision of a driving tool which comprises in combination: a hollow housing, a cylinder disposed in the housing and subdividing the interior of the housing into a first chamber located between the housing an cylinder which serves as an air reservoir and a second chamber within the cylinder, a hammer or impacting member, a piston reciprocally mounted within the cylinder for driving the hammer through a drive or impact stroke and a return stroke, means for positioning a fastener so that it is engaged and propelled by the hammer as the latter is driven through its impact stroke, a manifold for pressurized air communicating with the first chamber, and valve means for (a) selectively delivering air from the first chamber to one or the other of the second chamber according to whether the piston is to drive the hammer through its impact stroke or its return stroke, and (b) selectively exhausting air from ahead of one side of the piston on its impact stroke or from ahead of the other side of the piston on its return stroke. The valve means includes an extremely quick-acting wide-mouthed poppert valve to assure a rapid and large supply of motivating air from the air reservoir to the piston for its drive stroke so that the available air power is utilized to its full line pressure. The apparatus is further characterized by the return stroke of the piston and hammer being produced without the assistance of springs or like energy-storing devices that require transfer of energy thereto during the drive stroke, whereby substantially all the available energy applied to the piston during the drive stroke is utilized to drive or impact a fastener or other work piece. A further feature of the invention is that the hammer accelerates progressively over a substantial portion of its drive stroke and reaches its maximum velocity as the fastener is driven into the work-piece.

ILLUSTRATIVE EMBODIMENT OF THE INVENTION

In this application and the accompanying drawings, there is described and shown a preferred embodiment of the invention and certain modifications thereof, but it is to be understood that these are merely exemplary and that other changes and modifications can be made within the scope of the invention.

THE DRAWINGS

FIG. 3 is a sectional view taken along line 3—3 of FIG. 2 showing the device with its hammer in a retracted or ready position;

FIGS. 3A and 3B are enlarged views of two portions of FIG. 3;

FIG. 4 is a view like that of FIG. 3 showing the same device with the hammer at the completion of its impact stroke;

FIG. 5 is a cross-sectional view of the nail magazine taken along line 5—5 of FIG. 3;

DESCRIPTION OF THE INVENTION

Figure 1:
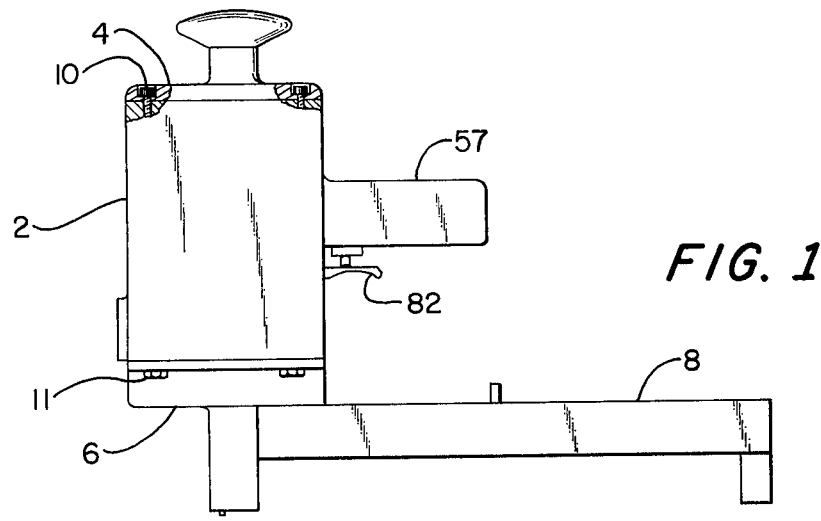
FIG. 1 is a side view in elevation of a nail driver constituting a preferred embodiment of the invention.
Figure 2:
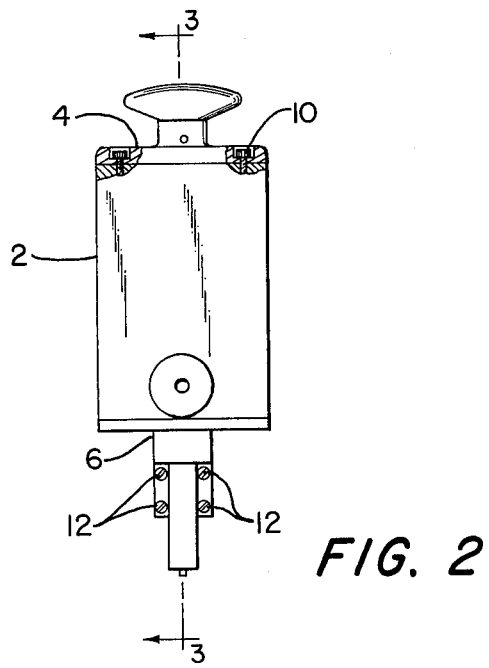
FIG. 2 is an end view in elevation of the same device.

Referring now to FIGS. 1 and 2, the illustrated apparatus comprises a hollow housing 2; a cap member 4; a nail receiving and positioning head 6; and a magazine 8 for holding a supply of nails and feeding them to the nail receiving and positioning head 6. Cap member 4 and head 6 are detachably secured to the upper and lower ends of the housing by means of screws 10 and 11 which are screwed into tapped holes formed in the housing. The magazine is detachably secured to the head 6 by means of screws 12 which pass through holes in the head and are screwed into tapped holes in the adjacent end of the magazine.

Figures 3B, 4:
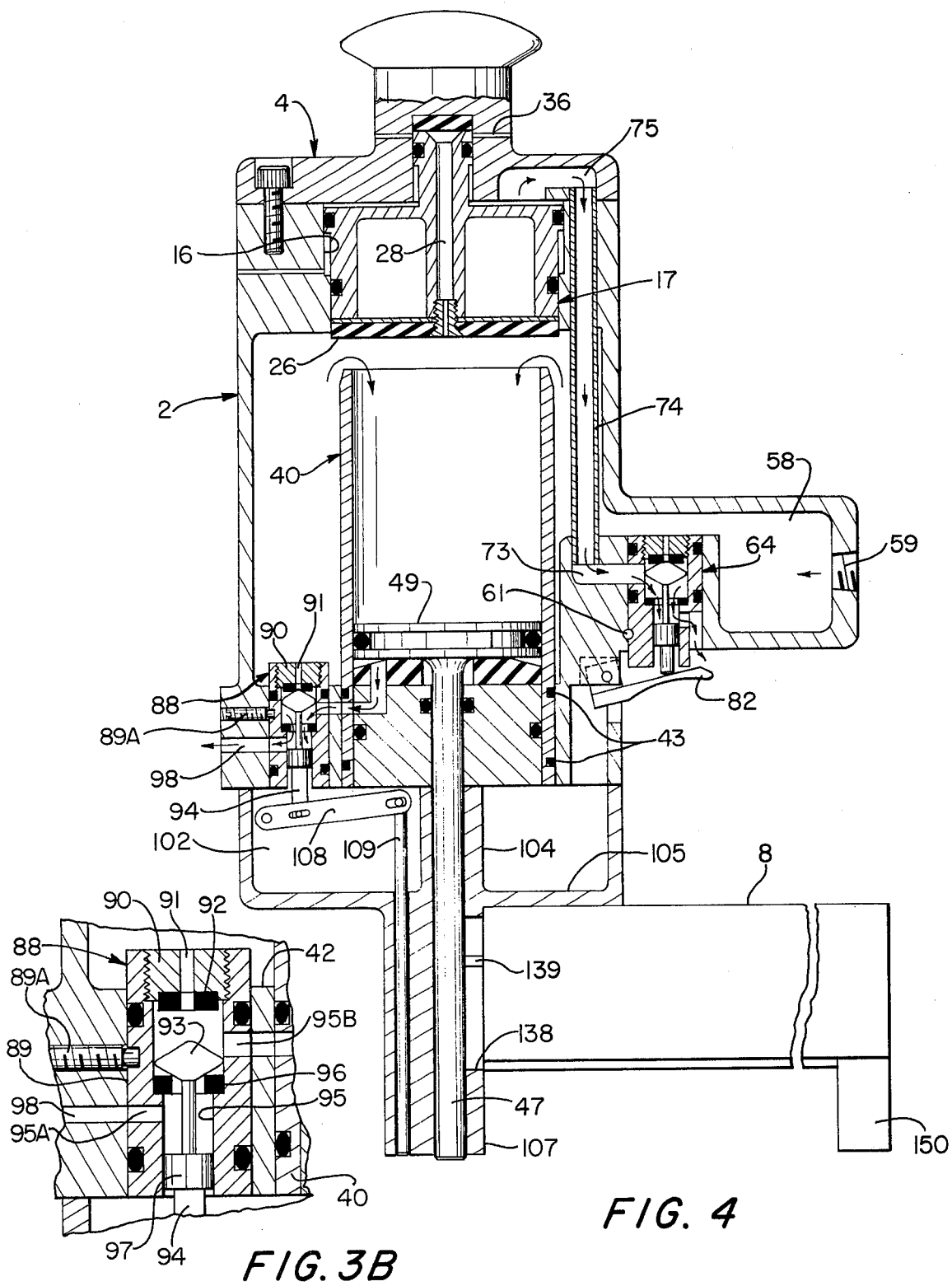

Referring now to FIGS. 3 and 4, the upper end of the housing has an end wall 14 which serves as a poppet valve housing. To this end a cylindrical bore 15 is formed in the end wall 14 and the upper end of bore 15 is counterbored as shown at 16. Slidably mounted in bore 15 is a hollow poppet valve that is identified generally by numeral 17 and which comprises a cylindrical wall 18 sized to make a close sliding fit with bore 15, a peripheral flange 19 at the upper end of wall 18 sized to make a close sliding fit in counterbore 16, and an upper end wall 20. The poppet valve also includes a centrally located boss 21 formed integral with end wall 20 and spaced from wall 18 so as to form an internal annular cavity 22. The outer surfaces of wall 18 and flange 19 are provided with circumferentially-extending grooves in which are disosed resilient sealing rings 23 that bear against the surrounding surfaces that define bore 15 and counterbore 16 and serve to prevent leakage of fluid while allowing the poppet valve to move axially. Ring seals 23 are preferably but not necessarily made of an elastomer material and may be in the form of O-rings. The upper end wall 14 of housing 2 is preferably provided with one or more passageways 24 that lead from counterbore 16 to the atmosphere. Passageways 24 serve as bleeds to prevent a pressure buildup in the space between the lower side of flange 19 and the annular shoulder formed by the junction of bore 15 and counterbore 16.

The bottom end of the poppet valve is closed off by a substantially rigid circular metal plate 25 and a circular resilient sealing pad 26 bonded to plate 25. The latter elements are formed with central apertures to accommodate a hollow screw or threaded bushing 27 which is screwed into lower end of an axial bore 28 formed in boss 21. Additionally, the poppet valve comprises a cylindrical axial extension 29 which is formed integral with end wall 20 and has an internal bore which forms an extension of bore 28. The cap member has a cavity 31 of circular cross-section to accommodate extension 29 and the upper end of the latter has a peripheral flange or piston 32 that is sized to make a close sliding fit in cavity 31. The outer surface of flange 32 has a circumferentially-extending groove in which is positioned another sealing ring 34 (similar to sealing rings 23) that bears against the surrounding surface of the cap member and serves to prevent leakage of fluid while allowing extension 29 to move axially in cavity 31. A resilient sealing pad 35 is secured in the upper end of cavity 31 for engagement by the flat upper end surface of extension 29. Pad 35 acts as a valve seat for extension 29. Additionally, cap member 4 includes one or more passageways or ports 36 that extend from cavity 31 to the atmosphere. The hollow extension 29, bore 28, cavity 31, pad 35, and passageways 36 together constitute a vent valve for selectively discharging fluid from the underside of the poppet valve to the atmosphere. Preferably the axial dimensions of cavity 31, extension 29, bore 15, counterbore 16, flange 19 and wall 18 are set so that when the poppet valve is moved upwardly, a small gap exists between surfaces 37 and 38 when the flat upper end surface of extension 29 is seated tightly against pad 35 as shown in FIG. 4. The effective area of the annular upper surface 37 of poppet valve 17 is greater in area than the underside of pad 26.

Pad 26 functions to provide a tight seal between the poppet valve and the upper edge of a cylinder 40 when the poppet valve is in its down or closed position (FIG. 3). Cylinder 40 is formed with open top and bottom ends and its internal diameter is constant throughout its length. The bottom end of cylinder 40 is secured in an opening formed in the bottom end wall 42 of housing 2. Cylinder 40 may be secured to end wall 42 in various ways, e.g., by a screw thread connection, a shrink fit or by welding or brazing. Preferably the bottom end of the cylinder has two circumferential grooves to accommodate resilient sealing rings 43 (like ring seals 23 and 34) which bear tightly against the surrounding surface of end wall 42. The bottom end of cylinder 40 is closed off by a plug 44 which also may be secured to the cylinder in various ways, e.g., by a screw thread connection, a shrink fit, or by welding or brazing. Leakage of fluid between the outer surface of plug 44 and the inner surface of cylinder 40 is prevented by another resilient sealing ring 45 seated in a circumferential groove in the plug. The latter also is formed with a round axial bore 46 to slidably accommodate a hammer or driving member 47. The plug is formed with an internal groove around bore 46 to accommodate a resilient sealing ring 48 that surrounds and engages the outer surface of hammer 47 with just enough force to prevent leakage of fluid therebetween while at the same time allowing the hammer to move axially. The upper end of hammer 47 is attached to a circular piston 49 that has flat upper and lower surfaces and is sized so that it makes a close sliding fit with the inner surface of cylinder 40. Piston 49 has a peripheral groove in which is disposed a resilient sealing ring 50 that bears against the smooth inner surface of the cylinder and functions to prevent fluid from leaking between the piston and cylinder. An annular resilient cushion member 52 is attached to the inner surface of plug 44. Preferably the inner diameter of member 52 is sized so as to provide a substantial gap between it and hammer 47 in order to avoid any friction force that would tend to impede movement of the hammer. Cushion member 52 is preferably made of an elastomer such as a synthetic or natural rubber compound, but it also may be made of a resilient plastic material.

The outer surface of cylinder 40 is spaced from the inner surface of housing 2 so as to provide a chamber 54 which serves as an air reservoir. Additionally, the outer diameter of cylinder 40 is less than the outer diameter of the poppet valve by a selected amount so that a substantial marginal portion of pad 26 projects radially of the cylinder as shown in FIG. 3. Preferably but not necessarily, the upper end of the cylinder has an outside bevel 55 to maximize the amount of pad 26 which projects out beyond the upper edge surface of cylinder 40.

Still referring to FIGS. 3 and 4, the housing 2 is formed with a hollow lateral extension 57 which defines a manifold chamber 58 for supplying air or other pressurized fluid to reservoir chamber 54 and also to other portions of the device as hereinafter described. Extension 57 has an inlet port 59 which is threaded for coupling to a flexible hose line (not shown) leading to a regulated source of pressurized fluid, e.g., an air compressor. Manifold chamber 58 communicates directly with reservoir chamber 54 via a passageway 60. One portion of housing extension 57 is formed with a relatively thick wall section 62 which is provided with a bore 63 to accommodate a control valve 64.

Referring now to FIGS. 3 and 3A, control valve 64 comprises a control valve housing 65 which is secured in bore 63 by a dowel pin 61. As seen best in FIG. 3A, control valve housing 65 is closed off at one end by a bushing 66 that defines a port or orifice 67 leading to passageway 60. An apertured pad 68, preferably made of resilient material, is secured to the inner end of bushing 66 and serves as a valve seat for a control valve member 69. Housing 65 also has a bore 70 at its other end to accommodate a valve rod assembly 71 that is connected directly to valve member 69. At the inner end of bore 70, the valve housing 65 has a shoulder to which is secured another apertured pad 72 that is like pad 68 and also serves as a valve seat for valve member 69. Intermediate the two valve seats, housing 65 is provided with a side port that connects directly with one end of a passageway 73 formed in wall section 62. Connected to the opposite end of passageway 73 is a tube 74 that extends lengthwise of chamber 54 and extends through and is secured in the upper end wall 14 of housing 2. The upper end of tube 74 communicates directly with a passageway or cavity 75 in cap member 4 that opens into counterbore 16 of the poppet valve housing. Referring again to the control valve, housing 65 has another port 76 that at one end communicates with bore 70 and at the other end is open to the atmosphere via a slot 77 formed in the side of housing 65. The valve rod assembly 71 includes a piston 79 that is sized to make a sliding fit in bore 70.

Control valve member 69 is shaped so that when it is moved up against pad 68, it will close off port 67 and when it is moved down against pad 72, it will close off the control valve chamber from bore 70. However, in either position control valve member 69 is incapable of blocking off the side port leading to passageway 73. When the manifold inlet port 59 is connected to a source of high pressure air, the air in manifold chamber 58 will act via port 67 to force control valve member 69 down against pad 72, whereby air will flow through the control valve housing 65 up into cavity 75 of cap member 74 via passageway 73 and tube 74, and the resulting air pressure in cavity 75 will force poppet valve member 17 down onto the upper end of cylinder 40.

The control valve member is shifted to its upper position by means of a trigger 82 that is pivotally connected to housing 2. For this purpose the bottom end wall 42 of housing 2 has a vertically extending cavity 83 and a side opening 84 that intersects cavity 83. The inner end of trigger 82 extends through opening 84 into cavity 83 and has a tongue that extends into a slot 86 in the side wall of housing 2 and is pivotally attached to the housing by a pivot pin 87. The outer end of trigger 82 projects under the outer end of valve rod assembly 71. When the trigger is pulled up, i.e., pivoted counterclockwise as viewed in FIG. 3, it will engage piston rod assembly 71 and force it upward so that valve member 69 will close off port 67 and allow high pressure air in counterbore 16, cavity 75, tube 74 and passageway 73 to be exhausted to the atmosphere via port 76 and slot 77.

The bottom end wall 42 of housing 2 also is formed with a circular bore to accommodate an exhaust or safety valve 88 which is similar to control valve 64. As seen best in FIG. 3B, valve 88 comprises an exhaust valve housing 89 which is secured in the bore in end wall 42 in any suitable manner, e.g. by a set screw 89A or by a screw connection or a friction fit. Housing 89 is closed at one end by a threaded bushing 90 that defines a port or orifice 91. An apertured pad 92, preferably made of a resilient material, is secured to the inner end of bushing 90 and serves as a valve seat for an axhaust valve member 93 which is attached to a valve rod assembly 94. The other end of valve housing 89 has a bore 95 to accommodate vave rod assembly 94. At the upper end of bore 95 the housing 89 has a shoulder to which is secured another apertured pad 96 which also serves as a seat for valve member 93. The latter has a piston 97 that makes a sliding fit with bore 95. Valve housing 89 has a lower side port 95A that connects bore 95 with an exhaust port 98 formed in the lower end wall 42 of housing 2, and an upper side port 95B that connects its interior space through a hole in the lower end of cylinder 40 with a passageway 99 in the lower end wall 42. Passageway 99 communicates with the interior of cylinder 40 through an opening in pad 52. Valve member 93 is adapted to close off port 91 when it is moved upward against pad 92 and to close off the upper end of bore 95 when it is seated against pad 96. However, in either position valve member 93 is incapable of closing off the upper side port 95B that leads to passageway 99. Hence, when valve member 93 is seated against pad 96, air can flow from air reservoir 54 into the lower end of cylinder 40 via port 91 and passageway 99, and exhaust port 98 is closed off. When valve member 93 is seated against pad 92, port 91 is closed off and air can be exhausted from the lower end of cylinder 40 via passageway 99, bore 95 and exhaust port 98.

Movement of valve member 93 is controlled by a mechanical linkage that is carried by the head 6. The upper end of head 6 has a cavity 102 and a boss 104 that extends up from its bottom end wall 105 and preferably engages plug 44. Boss 104 has an axial bore 106 that is aligned with and is sized to slidably accommodate hammer 47. Head 6 also has a lower axial extension in the form of a foot 107 which has a bore that is an extension of bore 106. The aforesaid mechanical linkage that controls movement of valve member 93 comprises a lever arm 108 that is disposed in cavity 102 and an actuating rod 109 that is slidably positioned in a bore 110 in foot 107 that extends parallel to bore 106. One end of lever arm 108 is pivotally anchored to head 6 by means of a pivot pin 111. The other end of arm 108 is pivotally attached to the upper end of rod 109 by means of a pivot pin 113 that is carried by rod 109 and extends into an elongate slot 114 in arm 108. The latter is pivotally connected to valve member 93 by means of a pivot pin 115 that is attached to the lower end of valve rod assembly 94 and extends into another elongate slot 116 formed in arm 108.

In the absence of any high pressure air in the device, the weight of rod 109 and arm 108 is sufficient to hold valve member 93 down on pad 96 when the device is oriented vertically as shown in FIG. 3. The length of rod 109 is such that it will project out beyond the flat bottom surface 118 of foot 107 a short distance, e.g., $\frac{1}{4}-\frac{1}{2}$ inch, when valve member 93 is seated on pad 96 and will be flush with end surface 118 when valve member 93 is seated against pad 92. If high pressure air is supplied to the device, valve member 93 will remain seated against pad 96 regardless of the orientation of the device until rod 109 is subjected to an upward force sufficient to overcome the downward force resulting from the influence of high pressure air in chamber 54 acting on the upper side of valve member 93.

Referring again to FIGS. 3 and 5, the magazine 8 is hollow and defines an elongate channel 122 defined by opposite side walls 124, a bottom wall 126, and a top wall 128. Each side wall is formed with a relatively shallow upper groove 130 and a relatively deep lower groove 131 separated by a rib 132. Grooves 130 act to receive and guide the fasteners to be driven. In this case the fasteners comprise nails 134 whose shanks are embedded or frictionally disposed in plastic sleeves 135 which are tied together by connecting sections 136. Sleeves 135 and sections 136 are molded as a continuous strip. Sleeves 135 are sized to extend into grooves 130 so that they are slidably supported by ribs 132. Also, sleeves 135 are made equal to or slightly greater in diameter than the heads of nails 134 and further their diameters are sized so that they will make a close fit with bore 106. Also, sleeves 135 have a length, preferably at least about $\frac{1}{4}$ inch, sufficient to keep the nail straight in bore 106 during the hammer's drive stroke. The front end of channel 122 communicates with an opening 138 in foot 107 which has a cross-sectional shape similar to that of channel 122 except that it lacks grooves corresponding to grooves 131. Thus, at each of its opposite sides opening 138 has a rib 139 (FIG. 4) corresponding to rib 132 so as to provide a support for sleeves 135. The series of nails are urged forward toward foot 107 by a pusher 140 which is disposed in channel 122 and has a rib 142 at each side which slidably fits into the adjacent groove 131. A tongue 146 on the lower side of pusher 140 is connected to one end of a tension spring 143 which extends around a pulley 144 that is rotatably mounted on a shaft secured in one of the side walls 124. The other end of spring 143 is secured to a pin 145 that also is anchored in a side wall 124. Spring 143 urges the pusher toward foot 107. Upper wall 128 of the magazine terminates short of the rear end of the magazine so as to provide an end edge 147 that acts as a stop for a finger 148 on the upper end of pusher 140, whereby to prevent the front end of the pusher from entering bore 106 and interfering with hammer 47 when the last nail has been discharged. The magazine 8 also is formed with a foot 150 whose bottom end surface is flush with the bottom end surface of foot 107. The two feet 107 and 150 cooperate to stabilize the fastening device and hold it perpendicular when it is placed against a substrate into which a nail 134 is to be driven.

The relative sizes of orifices 67 and 91 (together with the amount by which the poppet valve pad 26 protrudes beyond the upper edge of cylinder 40) are controlled so as to prevent downward travel of hammer 47 and possibly accidental firing of the device as it is connected to the high pressure air supply and also so as to assure rapid opening of the poppet valve, attain optimum utilization of available air power and limit the force required to operate trigger valve 64. In this connection it is to be noted that the volume of air reservoir 54 (which also should be considered to include the volume of passageway 60 and manifold chamber 58) is relatively large in comparison to both the internal volume of cylinder 40 and the combined volumes of the space above poppet valve member 17 when it is in its down position (FIG. 3), i.e. counterbore 16, chamber 75, tube 74 and passageway 73. Hence substantially more air is required to be moved to effect a large change in the air pressure in air reservoir 54 than is required to be moved to effect a corresponding change in the air pressure above the poppet valve or the air pressure below piston 49. To avoid any possibility of hammer 47 being driven downward accidentally as the high pressure air supply is connected to the device (whereby the nail located in bore 106 might be detached from the other nails and be driven down far enough to permit the next nail to be advanced into bore 106) it is essential to control the relative rates of flow of air (a) between manifold 58 and counterbore 16 and cavity 75, and also (b) between reservoir 54 and the underside of piston 49. This objective is achieved by appropriately proportioning the smallest effective cross-sectional area of the passageways connecting manifold chamber 58 with counterbore 16 of the poppet valve casing, i.e. the cross-sectional area of orifice 67, and the smallest effective cross-sectional area of the passageways connecting manifold chamber 58 with reservoir 54 and the interior of cylinder 40 below piston 49, i.e. the cross-sectional area of orifice 91. The first mentioned cross-sectional area is made smaller than the second mentioned cross-sectional area. The relative sizes of the two aforesaid smallest effective cross-sectional area will depend upon the volumes of counterbore 16 and cavity 75, reservoir 54 and cylinder 40, the overlap of the poppet valve 17 with cylinder 40, the diameter of piston 49 and the effective area of the upper surface 37 of poppet valve 17. However, in general best results are achieved when the second mentioned cross-sectional area i.e. orifice 91 is about four times the first mentioned cross-sectional area, i.e. orifice 67. Typically, the diameters of orifices 67 and 91 are about ⅛ and ¼ inch respectively where piston 49 has a diameter of about 3.0 inches and the overlap of poppet valve 17 is about ⅛ inch. The air supply inlet port 59 and passageway 60 are substantially greater than orifices 67 and 91 as shown in FIGS. 3 and 4 (for convenience of illustration only, orifices 67 and 91 are represented as approximately equal in the drawings).

Operation of the device shown in FIGS. 1-5 will now be described. Air under pressure, e.g. 125 psi, is supplied to the manifold chamber 58 by connecting inlet port 59 to a suitable supply of pressurized air such as an air compressor (not shown). This air passes through the orifice 67 and acts on the valve 69 so that the latter closes off the opening in pad 72. The air passing through orifice 67 proceeds through passageway 73 and tube 74 into the chamber 75 where it applies a force to the upper end of the poppet valve 17, whereby the latter is urged to assume the position shown in FIG. 3 wherein the rubber disc 26 forms a tight seal with the upper edge of cylinder 40. Simultaneously, air is supplied by passageway 60 to the air reservoir chamber 54 and proceeds through the orifice 91 of exhaust valve 88 to urge valve member 93 down against pad 96 to prevent discharge of air from exit passageway 98. The air entering the chamber of exhaust valve 88 also passes through passageway 99 into the cylinder 40, thereby providing a force on the underside of piston 49 which holds the piston up against the sealing disc 26 as shown in FIG. 3. Any air trapped between the upper end of the piston and the disc 26 is exhausted to the atmosphere via the passageway 28 and the ports 36. The device is now in its normal equilibrium position and cannot be fired unless the push rod 109 is forced upwardly far enough for valve member 93 to unblock the opening in valve seat 96. If the trigger is squeezed while operating rod 109 is in the position shown in FIG. 3, the valve member 69 will change positions and the air pressure acting on the upper side of the poppet valve 17 is released by discharge of air from chamber 75 via tube 74, the internal chamber of valve 64, and exit port 76. Hence, due to the pressure in reservoir 54, the poppet valve 17 will move up and thereby allow pressurized air to act on the upper end of piston 49. However, no movement of the piston will occur because an equilibrium force condition exists as a result of the opposing force of the pressurized air acting on the bottom surface of piston 49 and additional static frictional forces due to engagement of O-ring seal 50 with the cylinder 40 and the rod 47 with seal 48 (for this purpose, the seals 48 and 50 are arranged so that with commonly accepted mating tolerances they will develop a total static frictional force which is at least substantially equal to the downward force exerted on the piston resulting from the area differential between its upper and lower surfaces; it is to be noted also that if the diameter of rod 47 were to be made so large that the force resulting from the area differential is substantially greater than the static frictional forces exerted by the seals, all that will occur is that the piston 49 will merely crawl toward the lower end of the cylinder when the poppet valve is opened). If trigger 82 is repeatedly released and squeezed, the poppet valve will repeatedly move toward and away from cylinder 40 but piston 49 will remain stationary. In order to fire the unit, the safety mechanism actuator rod 109 must be pushed up far enough so that the valve member 93 now blocks orifice 91. When this occurs, the air pressure acting on the underside of piston 49 is rapidly exhausted to atmosphere by outflow of air via passageway 99, valve casing 89, bore 95 and port 98. If thereafter the trigger 82 is squeezed so as to move the valve member 69 up far enough to close off orifice 67, poppet valve 17 will move up rapidly toward chamber 75 and the full line pressure in reservoir 54 will act on the upper end of piston 49 so as to cause the latter to move rapidly through its normal firing stroke. The piston 49 will not return to its normal starting position until the actuator rod 109 is released and trigger 82 is also released.

The advantages of controlling the relative sizes of orifices 67 and 91 of the control and exhaust valves will now be described. When inlet 59 is connected to a source of high pressure air, pressure builds up on both sides of poppet valve 17. If a rapid build-up of pressure were to occur in reservoir 54, poppet valve 17 might open and piston 49 might be driven downwardly a substantial amount by the air pressure acting on its upper side. However, making orifice 91 relatively large allows the air pressure in the bottom end of cylinder 40 to build-up quite fast, whereby piston 49 is place almost immediately in an equilibrium condition.

Where piston 49 is about 3.0 inches in diameter, the poppet valve stroke typically is about ⅜ inch and with a line pressure of about 125 psi, the poppet valve will open fully within about 3 milliseconds. The speed at which the poppet valve will open is influenced by the size of the vent opening in bushing 27 (as well as by the amount of overlap of the poppet valve relative to cylinder 40, and the smallest effective cross-sectional area of the passsageways leading from cavity 75 to the atmoshpere via valve 64). The smaller the opening in bushing 27, the faster poppet valve 17 will open. However, if the opening is too small, it will restrict the rate of upward movement of piston 49; also a whistling noise may be produced when piston 49 undergoes its return stroke. Typically where piston 49 is about 3.0 inches in diameter, the opening in bushing 27 is about ⅛ inch for optimum operation of the poppet valve.

It has abeen determined that certain design criteria must be observed in order to promote optimum operation of the device. In this connection it is to be appreciated that in order for the air power to be utilized to its full line pressure, it is essential that the poppet valve provide a relatively wide mouth for rapidly applying high pressure air from reservoir 54 to the upper end of cylinder 40. By way of example, with piston 49 having a diameter of about 3.00 inches, the maximum poppet valve opening (i.e. the maximum gap between the poppet valve and cylinder 40) is preferably between 0.3 and 0.5 inch. Secondly, in order to allow the hammer to reach its maximum velocity under the applied pneumatic power, the length of the hammer 47 is set so that the hammer experiences a predetermined amount of travel prior to driving the nail into the work-piece. This pretravel will vary according to the nature of the work-piece or substrate into which the nail is to be driven, but preferably it is at least about two inches. In its at-rest position, the hammer may be close to the nail positioned in bore 106, but preferably it is spaced from the nail a substantial distance.

Figure 6:
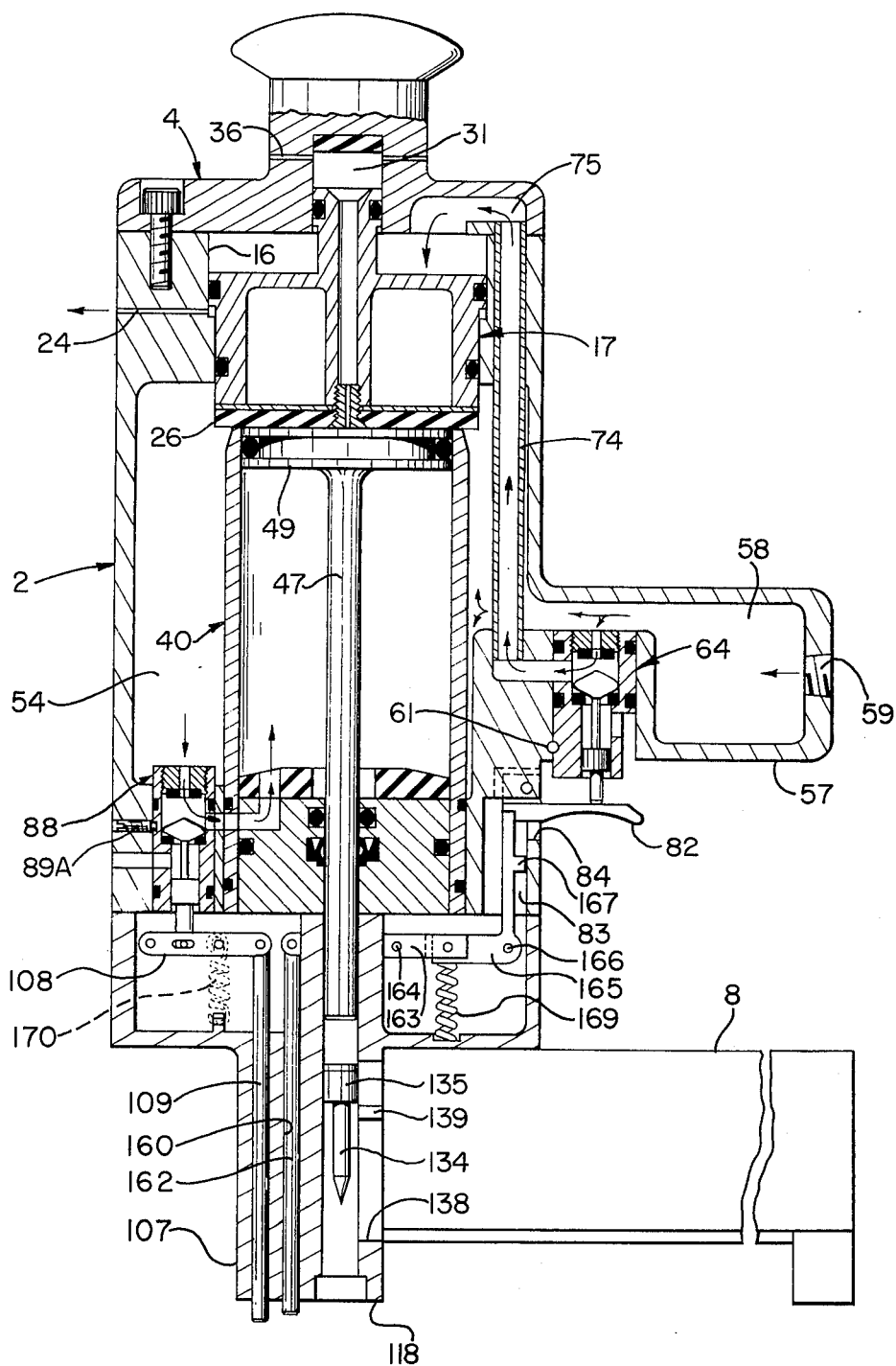
FIG. 6 is a view like FIG. 3 of another embodiment of the invention in ready position.
Figure 7:
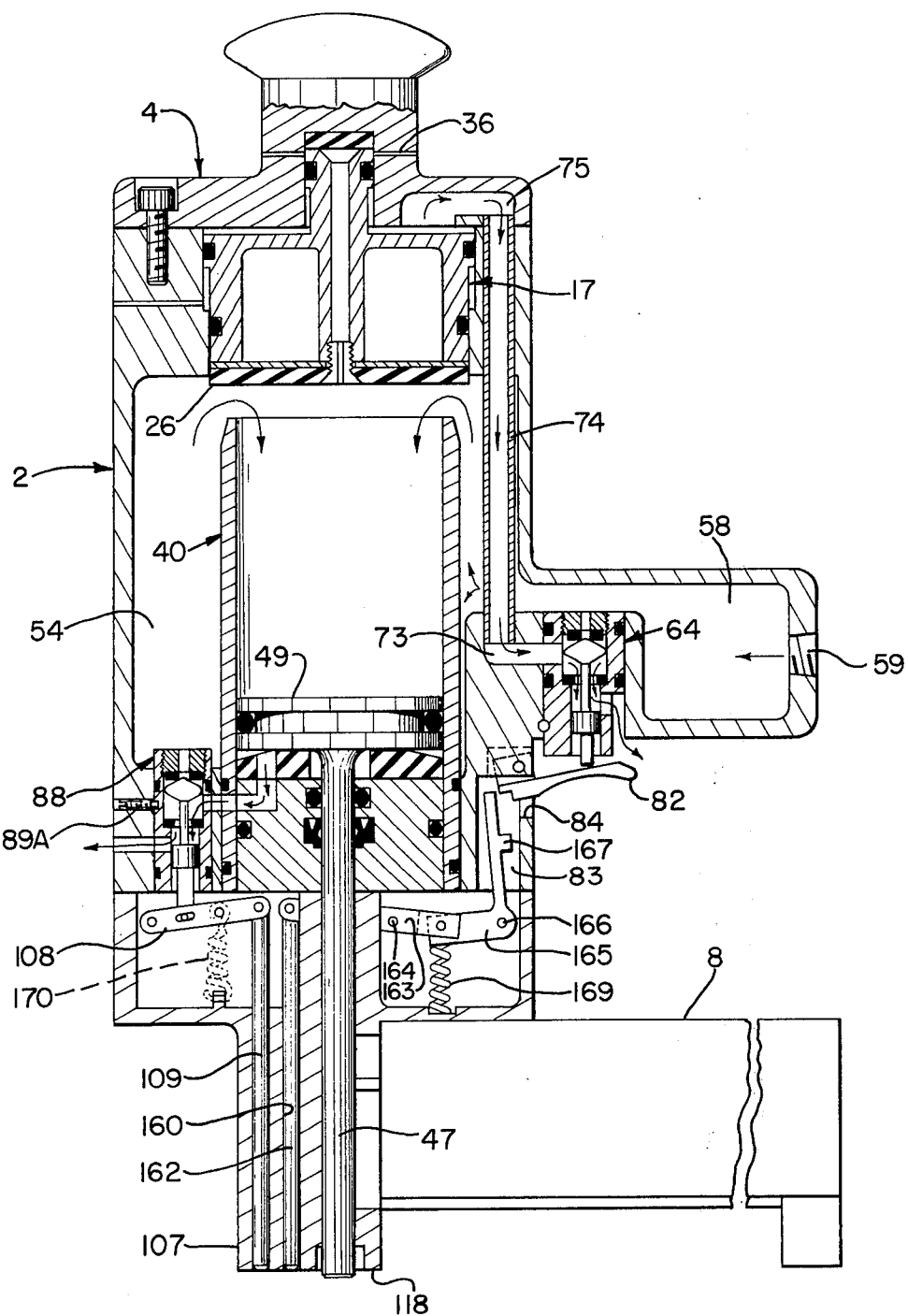
FIG. 7 shows the device of FIG. 6 with the hammer at the completion of its impact stroke.

FIGS. 6 and 7 disclose a modification of the invention incorporating a trigger lock mechanism. This modification is preferred for larger diameter hammers. In this connection it is to be recalled that when the trigger of the embodiment of FIGS. 3 and 4 is operated without pushing safety rod 109 up far enough to block orifice 91, the poppet valve will open but no motion of hammer 47 will occur because an equilibrium force condition exists because of frictional forces on piston ring seal 50 and hammer seal 48. However, if the hammer diameter and/or the line air pressure is increased, the force acting on the upper side of piston 49 may be so great relative to the force acting on the lower side of the piston as to cause the hammer to move toward the nail in bore 106 when the trigger is squeezed even though rod 109 is not pushed up far enough to close off orifice 91 of the exhaust valve. Hence, it may be desirable in certain cases to provide a trigger safety mechanism to prevent movement of hammer 47 except when safety rod 109 is depressed far enough to operate the exhaust valve. As a practical matter is has been found that the desired equilibrium force condition is easily attained where the hammer diameter is not larger than about ⅜ inch and does not exceed about 20% of the diameter of piston 49, and the air pressure in reservoir 54 does not exceed about 75 psig.

Referring how to FIGS. 6 and 7, the head 6 is provided with a second axially extending bore 160 in which is disposed a second operating rod 162. The upper end of rod 162 is pivotally connected to one end of a link 163 which is pivotally attached to head 6 by a pivot pin 164. The other end of link 163 is pivotally connected to a crank 165 which is pivotally connected to head 6 by means of a pivot pin 166. The upper end of the crank extends into a notch formed at the inner end of trigger 82 and a side abutment 167 on the crank engages the inner surface of the housing 2 to limit pivotal movement of the crank arm in a clockwise direction. A compression spring 169 acts between a portion of the head 6 and the bottom end of crank arm 165 to urge the crank arm to the position shown in FIG. 6, whereby the bottom end of operating rod 162 protrudes slightly below the bottom surface 118 of foot 107. Crank 165, link 163, and rod 162 form a trigger latch mechanism. So long as actuating rod 162 is not forced upwardly in the foot 107, the spring 169 maintains the crank in the position shown in FIG. 6 whereby the upper end of the crank locks trigger 82 so that it cannot be squeezed to operate control valve 64. If, however, the device is held down on a substrate into which a nail is to be driven so that the reaction force of the substrate forces actuating rod 162 upwardly and thereby causes link 163 to pivot crank 165 counterclockwise (FIG. 7) far enough for its upper end to become disengaged from trigger 82, the trigger will be free to fire the device. Spring 169 will urge crank 165 back to the position shown in FIG. 6 when the force urging rod 162 upwardly is removed. If trigger 82 is released after rod 162 has returned to the position shown in FIG. 6, crank arm 165 will move counter-clockwise under the influence of the notched end of trigger 82 far enough to allow the trigger to return to its locked position. As is apparent, actuating rod 109 and 162 are located close enough to each other so that when foot 107 is passed down onto a substrate or work piece, both rods will be depressed at the same time. Preferably rod 109 projectss out further from foot 107 than does rod 162, so as to assure that the latter will not be depressed without the former being depressed. More preferably, rod 109 projects further than rob 162 such that trigger 82 remains locked until rod 109 has moved up enough to cause valve member 93 to block orifice 91.

In practice the air pressure acting on valve member 93 of exhaust valve 88 biases rod 109 downward with a force that is sufficient to comply with statutory requirements. Typically, safety laws for powder-actuated devices prescribe that a force of at least about 35 pounds be required to operate a safety mechanism like rod 109, and this requirement is easily satisfied by the pneumatic force acting on valve member 93. However, if desired, the force required to depress rod 109 may be increased or decreased by merely changing the diameter of valve member 93, or by regulating the air pressure in reservoir 54, or by spring-biasing the rod. Thus, as shown in FIGS. 6 and 7, a tension spring 170 may be connected between link 108 and head 6 so as to oppose upward movement of rod 109 and valve assembly 71.

Figure 8:
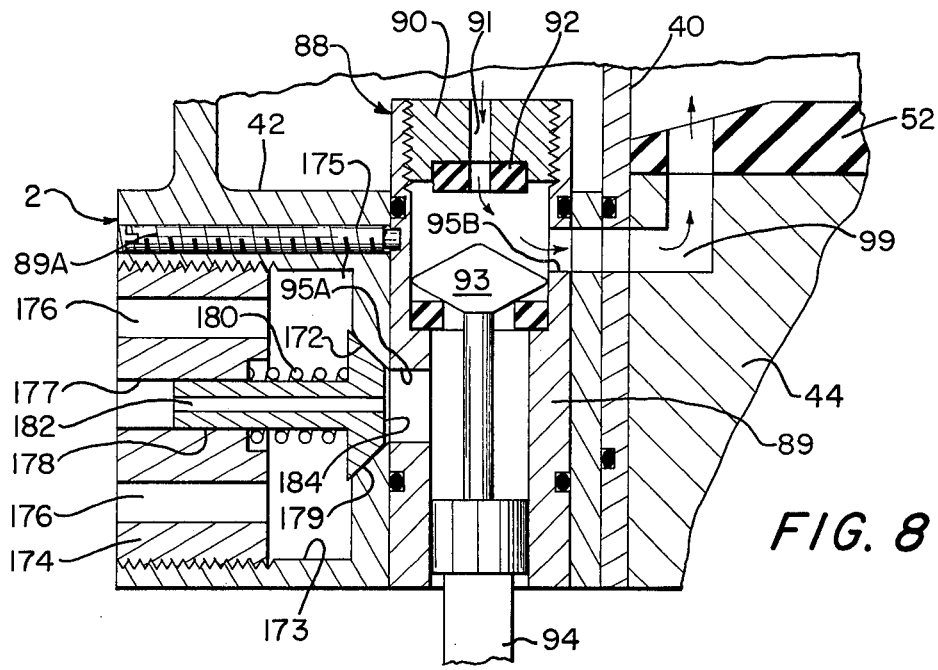
FIGS. 8 and 9 are enlarged fragmentary sectional views in elevation of an auxiliary exhaust control valve that may be used in the devices of FIGS. 3 and 6.
Figure 9:
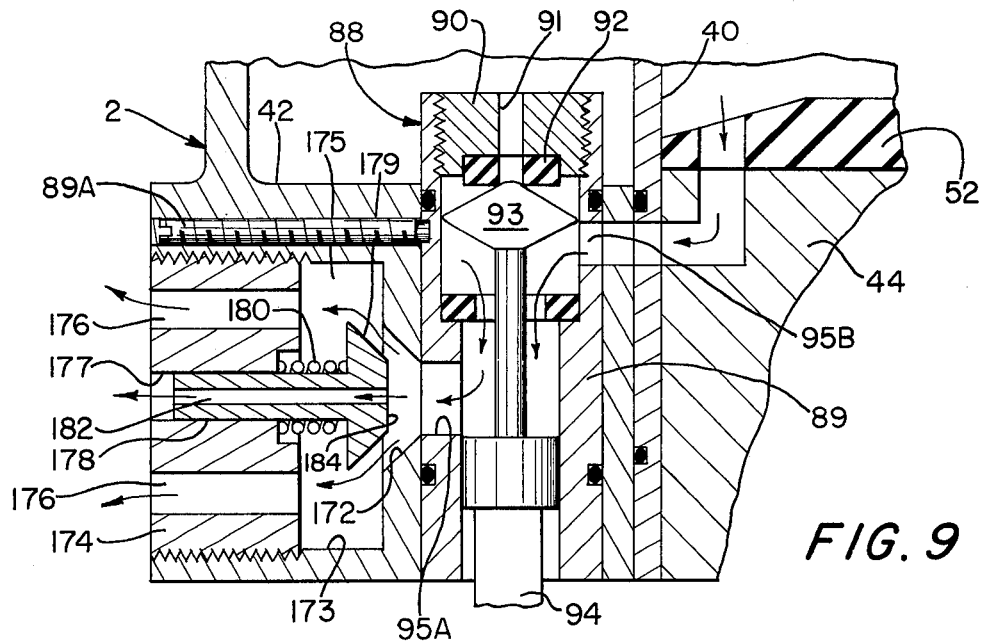

FIGS. 8 and 9 illustrate operation of an auxiliary exhaust control valve that may be incorporated in the devices shown in FIGS. 3 and 6 for the purpose of further controlling the velocity of piston 49 during the drive stroke so as to maximize the energy output of hammer 47. As is obvious to a person skilled in the art, the velocity achieved by the hammer during its drive stroke affects the energy output of the device. Because the device does not incorporate any spring for assisting piston 49 to execute its return stroke, the velocity at which hammer 47 is driven downward when the device is fired depends upon the rapidity with which the poppet valve fully opens to apply the full line air pressure to the upper end of piston 49 and the rate at which the air pressure on the underside of the piston is relieved (the effect of fricton on hammer 47 and piston 49 is almost negligible during the work stroke). In the development of this invention, it has been determined that if the passageway provided for exhausting air from the bottom end of cylinder 40 in advance of piston 49 offered no impedence to such air flow, the energy output of hammer 47 would be diminished. This result is believed to be due to a dissipation of air power because of movement of the piston at the beginning of the work stroke which prevents the hammer from achieving maximum acceleration. However, passageway 99, valve 88 and exhaust port 98 do offer a measurable impedance to air flow and by appropriately controlling the size of the foregoing, the velocity of the hammer is controllable, with the result that a vey high impact force is generated by the hammer on the nail in bore 106. By way of example, where piston 49 has a 3 inch diameter, the minimum opening provided by passageway 99, exhaust port 98 and the opening in valve seat 96 is about ¼ inch, (in practice passageway 99, exhaust port 98 and the opening in valve seat 96 may but need not be made with equal diameters). Nevertheless, it has been determined that if the minimum effective cross-sectional area of the exhaust path provided for the bottom end of cylinder 40 is variable, the energy output of the unit may be further improved. Therefore, as shown in FIGS. 8 and 9, the exhaust port 98 is replaced by a tapered bore 172 which serves as a valve seat and a large counterbore 173. The latter is threaded to receive a valve body 174 which only partly fills the same so as to leave a flow chamber 175. Valve body 174 has one or more by-pass discharge passageways 176 and a main passageway 177 in which is slidably mounted a valve member 178 having a tapered valve head 179 sized to seat in bore 172. A compression spring 180 urges valve head 179 against seat 172. Valve member 178 has a through bore 182 whose diameter is relatively small compared to exhaust valve opening 95A, bore 172 and passageways 176.

This auxiliary valve functions as follows. During the initial part of the drive stroke of hammer 47, air is exhausted through bore 182. Bore 182 is sized so that during the initial part of the hammer's drive stroke air is exhausted at a first rate which allows the hammer to accelerate without any dissipation or air power. As the hammer continues its work stroke, air pressure builds up on the underside of piston 49 until finally enough pneumatic force is exerted on the flat end surface 184 of valve head 179 to overcome the force of spring 180, whereupon valve member 178 rapidly moves away from valve seat 182 and thereby permits air to be exhausted to the atmosphere at a much greater rate via passageways 176. In practice it is preferred that the auxiliary exhaust control valve be designed so as to open when hammer 47 has moved through about 40–80% of its work stroke.

The invention herein described offers a number of advantages. For one thing, it provides a device which is capable of developing more power per unit volume than prior known devices of similar intent. By way of example, device made in accordance with this invention and connected to an air supply of 125 psi are capable of driving nails with a length of 2 inches and a shank diameter of 0.153 inch through 1 inch thick pine into 8000 psi pre-stressed concrete. Secondly, it has safety features which prevent it from firing accidentally. Thirdly, it cannot be fired in a so-called automatic or repeat mode; successive shots cannot be fired without first releasing safety rod 109 and trigger 82 so that the unit can be recharged. Fourth, the drive piston 49 is simple and can have a small weight and size due to the unit's operating efficiency, with the result that the overall size of the device is substantially smaller than other known devices of similar power output. Fifthly, the popper valve is entirely pneumatically operated and when open, provides a relatively large opening for applying air to piston 49 from air reservoir 54. Also, the poppet valve has a low weight due to its hollow design. This not only also reduces the overall weight of the device but also contributes to the poppet valve's extremely fast operating speed. Seventhly, optimum efficiency is achieved with relatively simple and reliable valving. Still another advantage is that the device may be used to drive different types of fasteners or for other impacting operations, e.g., punching holes in a plate. Furthermore, the device may be designed to accept a pre-filled disposable magazine in place of the refillable magazine 8. Also, the device is relatively quiet when operated. Still another advantage resides from the fact that the upper end of the device may be provided with a knob or handle as shown for pressing it down onto a substrate with enough force to depress rod 109 (and also rod 162).

A further significant advantage with respect to extending the life of the tool is derived from the fact that the hammer 47 is made long enough so that its outer end will protrude from the end surface 118 of foot 107 as the piston 49 reaches cushion 52 at the end of its work stroke (see FIGS. 4 and 7). Preferably, the hammer is made long enough so that it will project at least about 1/16th inch and more (preferably 3/16th inch) beyond the end surface 118 of the foot 107 before the piston 49 commences to compress the cushion 52. In driving a nail into a rigid substrate e.g., a metal plate overlying a concrete floor, the end surface 118 engages the work, and the nail driving stroke is completed when the end of the hammer is flush with the end surface 118. However, the pneumatic force driving the hammer will urge it to keep moving down and, since it is long enough to do so, the hammer will move beyond the end surface 118 before the cushion 52 begins to exert a decellerating force on piston 49. This movement of the hammer beyond surface 118 causes the tool to recoil up away from the work. This upward recoil of the tool allows the valve member 93 of exhaust valve 88 to move away from its valve seat 92 (due to the differential between the relatively high pressure in chamber 54 and the near atmospheric pressure in valve body 89) just enough to let high pressure air pass from chamber 54 through the interior of valve body 89 into cylinder 40 on the underside of piston 49. In this connection it is to be noted that since valve member 93 makes a sliding fit with the valve body 89 (typically a diametral clearance of between 0.001 and 0.005 inch is provided), air from chamber 54 can leak past the valve member 93 as soon as it is moved off of its valve seat 92, or its valve seat 96 (the valve member 69 of control valve 64 makes a comparable sliding fit in its valve body 65). As a consequence of the exhaust valve 88 opening enough to allow air to pass from chamber 54 into the bottom end of cylinder 40, a pneumatic force or air cushion is provided on the underside of the piston which tends to decellerate the piston rapidly so that the piston compresses the cushion 52 only slightly or stops just short of it. As a consequence, the piston does not strike the cushion 52 hard enough to put a large tensile stress on the bolts 11 which hold the nail receiving or positioning head 6 to the housing 2. Without this decellerating action at the terminal portion of the driving stroke of the hammer, the force exerted by the piston on the end wall member 44, and thus on the head 6, might overload the screws 11 and thus might tend to damage the tool or cause its breakdown after a short period of use. The decelleration of the hammer is very fast and occurs almost instantaneously after the bottom end of the hammer has moved flush with the end surface 118 of foot 107. This same feature prevents damage to the tool in the event it is held against a work surface and fired after the supply of nails has been exhausted. In such event, the hammer will strike the work surface before the piston reaches cushion 52 and the recoil of the tool will cause valve 88 to open enough to decellerate the piston and thereby prevent the piston from destructively impacting the cushion as previously described. It is to be noted that the slight opening of exhaust valve 88 which occurs on the upward recoil movement of the tool does not cause the piston 49 to move upward again, for the simple reason that the poppet valve 17 will still be open. Piston 49 can move up again only after the operator has released trigger 82.

A final advantage is that the device is capable of a number of modifications obvious to persons skilled in the art without detracting from the advantages already noted.

What is claimed is:

1. An improved fastener driving apparatus comprising:
   a hollow housing having first and second opposite ends;
   a cylinder mounted within said housing and extending between said first and second opposite ends, said cylinder having first and second opposite ends and the interior of said housing being divided into a first chamber located between said housing and said cylinder and a second chamber within and defined by said cylinder;
   first and second end means closing off said first ends of said housing and said cylinder respectively, said second end means defining a first opening communicating with the interior of said cylinder;
   a hammer disposed so as to be movable lengthwise through said first opening between a first retracted position and a second extended position;
   a piston slidably mounted within said cylinder for driving said hammer from one to the other of its said first and second positions;
   a first passageway communicating with the interior of said cylinder at said first end thereof,
   third end means including a poppet valve closing off said second end of said housing, said poppet valve including a hollow valve casing and a poppet valve member comprising piston means slidably mounted in said valve casing for reciprocal movement between a first position wherein said poppet valve member is spaced from said cylinder and said second chamber is open to said first chamber via said second end of said cylinder and a second position wherein said poppet valve member engages said second end of said cylinder and closes off said second chamber from said first chamber;
   a third chamber having an inlet for connection to a supply of pressurized air and an outlet communicating with said first chamber;
   a second opening connecting said first passageway with said first chamber;
   an exhaust port in said housing connecting with said first passageway;
   a first control valve for selectively blocking flow of air between said first passageway and either said second opening or said exhaust port;
   means defining at least one second passageway for transmitting air from said third chamber to the interior of said poppet valve casing so as to exert air pressure on said piston means in a direction to urge said poppet valve member to its said second position; and
   a second control valve for selectively (a) blocking flow of air from said third chamber to said second passageway and for simultaneously venting air from said second passageway and said valve casing, whereby when said first control valve blocks flow of air between said first passageway and said second opening, the pressure of air in said first chamber forces said piston means to move said poppet valve member to said first position and forces said piston to drive said hammer to its second extended position, and (b) resuming flow of air to said second passageway from said third chamber and stopping the venting of air from said second passageway and said valve casing whereby (1) flow of air in said second passageway to said poppet valve casing causes said piston means to move said poppet valve member to its said second position and (2) when said first control valve blocks flow of air between said first passageway and said exhaust port said piston is forced under the pressure of air in said first chamber to drive said hammer back to its said first position.

2. Apparatus according to claim 1 further including means projecting out of said housing for mechanically operating said first and second control valves.

3. Apparatus according to claim 2 wherein said last-mentioned means comprises first and second means for operating said first and second control valves respectively independently of one another.

4. Apparatus according to claim 1 including a trigger for operating said second control valve, means mounting said trigger in operative relation with said second control valve, means for releasably locking said trigger, and means for releasing said locking means.

5. An improved fastener driving apparatus comprising:
   a hollow housing having first and second opposite ends;
   a cylinder mounted within said housing and extending between said first and second opposite ends, said cylinder having first and second opposite ends and the interior of said housing being divided into a first chamber located between said housing and said cylinder and a second chamber within and defined by said cylinder;
   first end means closing off said first ends of said housing and said cylinder, said first end means defining an opening communicating with the interior of said cylinder;
   a hammer disposed so as to be movable lengthwise through said opening between a first retracted position and a second extended position;
   a piston assembly slidably mounted within said cylinder for driving said hammer from one to the other of its said first and second positions;
   a third chamber having an inlet for connection to a source of pressurized air, said third chamber communicating with said first chamber;
   second end means closing off said second end of said housing;
   a poppet valve including a hollow valve casing attached to said housing and a poppet valve member comprising piston means slidably mounted in said valve casing for reciprocal movement between a first position wherein said poppet valve member is spaced from said cylinder and said second chamber is open to said first chamber via said second end of said cylinder and a second position wherein said poppet valve member engages said second end of said cylinder and closes off said second chamber from said first chamber;
   a first passageway communicating with said second chamber at said first end of said cylinder;
   a first control valve for selectively transmitting air from said first chamber to said first passageway or from said first passageway to the atmosphere exterior of said housing;
   a second passageway communicating with said poppet valve casing; and
   a second control valve interposed between said third chamber and said second passageway for selectively (a) blocking flow of air from said third chamber to said second passageway and for simultaneously venting air from said second passageway and said poppet valve casing whereby the pressure of air in said first chamber forces said piston means to move said poppet valve member to said first position and, when said first control valve is positioned to transmit air from said first passageway to the atmosphere exterior of said housing, forces said piston assembly to drive said hammer to its second extended position, and (b) resuming flow of air to said second passageway from said third chamber and stopping the venting of air from said second passageway and said poppet valve casing whereby flow of air in said second passageway to said poppet valve casing causes said piston means to move said poppet valve member to its said second position and, when said first control valve is positioned to transmit air from said first chamber to said first passageway, said piston assembly is forced under the pressure of air in said first chamber to drive said hammer back to its said first position 6. Apparatus according to claim 5 wherein said second control valve comprises a hollow control valve casing having a first port leading to said third chamber, a second port leading to said second passageway, a third port leading to the atmosphere, and a control valve member movable so as to selectively close off said first and third ports, said control valve member being arranged so that air pressure in said third chamber will bias it in a direction to close off said third port, and further including a trigger member for moving said control valve member so that it closes off said first port.

7. Apparatus according to claim 5 further comprising:
at least one vent passageway in said poppet valve member which communicates at one end with said first end of said cylinder;
at least one vent port open to the atmosphere exterior of said housing and communicating with the opposite end of said at least one vent passageway; and
a vent valve for controlling flow of air between said at least one vent passageway and said at least one vent port, said vent valve comprising means connected to and movable with said poppet valve member for interrupting flow of air between said at least one vent port and said at least one vent passageway when said poppet valve member is moved to its said first position and for restoring said flow of air when said poppet valve member is moved out of its said first position.

8. Apparatus according to claim 5 further including a magazine for holding a plurality of fasteners which are disposed in single file and extend parallel to the path of movement of said hammer, means defining a guideway for said hammer, a fastener delivery aperture through which nails may be delivered one by one into said guideway for engagement by said hammer as said hammer is moved to its second extended position, and means for delivering said fasteners into said guideway via said fastener delivery aperture.

9. Apparatus according to claim 5 comprising an extension of said first end of said housing defining a guideway for said hammer, and an aperture opening into said guideway for introducing a fastener into said guideway in position to be driven by said hammer, said guideway having a length such that said hammer will travel at least about two inches in moving from its retracted position to its extended position before driving a fastener disposed in said guideway into a workpiece.

10. Apparatus according to claim 5 including an auxiliary control valve for controlling flow of air from said first control valve to the atmosphere exterior of said housing, said auxiliary control valve comprising means for increasing the rate of discharge of air to the atmosphere in response to an increase in air pressure in said first passageway.

11. Apparatus according to claim 10 wherein said auxiliary control valve is mounted to said hollow housing.

12. Apparatus according to claim 5 wherein said first control valve has an orifice leading from said first chamber to said first passageway and said second control valve has an orifice leading from said third chamber to second passageway, said first control valve orifice having a larger effective cross-sectional area than said second control valve orifice.

13. Apparatus according to claim 12 wherein the effective cross-sectional areas of said first and second control valve orifices are in a ratio of about 4:1.

14. An improved fastener driving apparatus comprising:
a cylinder having first and second ends with said first end being open and said second end being closed by an end wall;
an opening in said end wall;
a piston slidably mounted within said cylinder, said piston having an upper surface and a lower surface with said upper surface having a larger effective area than said lower surface;
a rod connected to said piston and extending through said end wall opening;
an air reservoir communicating with said first end of said cylinder;
a poppet valve comprising a hollow valve casing and a poppet valve member having first and second opposite surfaces with said second surface facing said first end of said cylinder, said first surface having a greater effective area than said second surface, said poppet valve member being slidably mounted in said valve casing for reciprocal movement between a first position wherein said second surface is spaced from said cylinder and said first end of said cylinder is open to said reservoir and a second position wherein said second surface engages said first end of said cylinder and closes off said cylinder from said reservoir, said poppet valve member having a peripheral portion of said second surface exposed to the air pressure in said reservoir when said second surface is engaged with said cylinder;
a first passageway leading into said poppet valve casing whereby air pressure may be applied to or relieved from said first surface of said poppet valve member;
an air inlet chamber communicating with said air reservoir;
means for connecting said air inlet chamber to a source of pressurized air;
a first control valve for selectively coupling said first passageway to said air inlet chamber or venting said first passageway to the atmosphere;
a second passageway leading into said second end of said cylinder; and
a second control valve for selectively coupling said second passageway to said air reservoir or venting said second passageway to the atmosphere.

15. A poppet valve member comprising:
a hollow body of circular cross-section having a first outside diameter at one end and a second smaller outside diameter at the other end;

an integral wall closing off said one end of said hollow body;

an extension formed integral with one side of said wall, said extension being coaxial with and extending away from said hollow body;

a boss formed integral with the opposite side of said wall, said boss being located within and extending coaxially of said hollow body;

a plate attached to said boss and closing off the other end of said hollow body, said plate having a smaller diameter than the outside diameter of said one end of said hollow body; and a passageway extending through said extension, said wall, said boss and said plate for conducting air through said valve member.

16. A poppet valve member comprising:

a hollow body of circular cross-section having a first outside diameter at a first end thereof and a second smaller outside diameter at a second end thereof;

first and second end walls closing off said first and second ends respectively of said hollow body;

a center opening in said second end wall;

a flat resilient outer surface on said second end wall surrounding said center opening, said resilient outer surface being flat and extending at a right angle to the longitudinal axis of said hollow body;

a tubular member formed integral with one of said end walls, said tubular member being located within and extending coaxially of said hollow body; and a tubular extension joined to said tubular member, said tubular extension extending outwardly and coaxially away from said first end of said hollow body, said tubular member and said tubular extension forming a passageway for conducting air through said valve member.

17. An improved fastener driving apparatus comprising:

a hollow housing having first and second opposite ends;

a cylinder mounted within said housing and extending between said first and second opposite ends, said cylinder having first and second opposite ends and being disposed so as to subdivide the interior of said housing into a first chamber located between said housing and said cylinder and a second chamber within and defined by said cylinder;

first end means closing off said first ends of said housing and said cylinder, said first end means defining an opening communicating with the interior of said cylinder;

a hammer disposed so as to be movable lengthwise through said opening between a first retracted position and a second extended position;

a piston assembly slidably mounted within said cylinder for driving said hammer from one to the other of its said first and second positions;

a third chamber having an inlet for connection to a source of pressurized air, said third chamber communicating with said first chamber, second end means including a poppet valve closing off said second end of said housing, said poppet valve including a hollow valve casing and a poppet valve member comprising piston means slidably mounted in said valve casing for reciprocal movement between a first position wherein said poppet valve member is spaced from said cylinder and said second chamber is open to said first chamber via said second end of said cylinder and a second position wherein said poppet valve member engages said cylinder and closes off said second chamber from said first chamber;

at least one vent passageway in said poppet valve member which communicates at one end with said first end of said cylinder;

at least one vent port open to the atmosphere exterior of said housing and communicating with the opposite end of said at least one vent passageway;

a vent valve for controlling flow of air between said at least one vent passageway and said at least one vent port, said vent valve comprising means movable with said poppet valve member for interrupting flow of air between said at least one vent port and said at least one vent passageway when said poppet valve member is moved to its said first position and for restoring said flow of air when said poppet valve member is moved out of its said first position;

a first passageway communicating with said second chamber at said first end of said cylinder;

a first control valve for selectively transmitting air from said first chamber to said first passageway or from said first passageway to the atmosphere exterior of said housing, said first control valve comprising a hollow valve casing mounted to said housing and having a first port leading to said first chamber, a second port leading to said first passageway, a third port leading to the atmosphere exterior of said housing, and a control member movable so as to selectively close off said first and third ports;

a second passageway communicating with said poppet valve casing; and a second control valve interposed between said third chamber and said second passageway for selectively (a) blocking flow of air from said third chamber to said second passageway and for simultaneously venting air from said second passageway and said poppet valve casing whereby the pressure of air in said first chamber forces said piston means to move said poppet valve member to said first position and, when said first control valve is positioned to transmit air from said first passageway to the atmosphere exterior of said housing, forces said piston assembly to drive said hammer to its second extended position, and (b) resuming flow of air to said second passageway from said third chamber and stopping the venting of air from said second passageway and said poppet valve casing whereby flow of air in said second passageway to said poppet valve casing causes said piston means to move said poppet valve member to its said second position, and, when said first control valve is positioned to transmit air from said first chamber to said first passageway, said piston assembly is forced under the pressure of air in said first chamber to drive said hammer back to its said first position with air being vented from said cylinder via said vent passageway and vent port.

18. Apparatus according to claim 17 wherein said first control valve is arranged so that high pressure air in said first chamber biases the said control valve member of said first control valve in a direction to close off said third port.

19. Apparatus according to claim 18 further including means for mechanically shifting the said control valve member of said first control valve in a direction to close off the said first port thereof.

20. Apparatus according to claim 19 wherein said means for shifting the control valve member of said first control member comprises a first activating member mounted to and projecting from said housing and means connecting said first actuating member and said control valve member for shifting said control valve member in a direction to close off the said first port of said first control valve when said first activating member is forced inwardly of said housing.

21. Apparatus according to claim 20 further including a trigger for operating said second control valve, and means mounting said trigger in operative relation with said second control valve.

22. Apparatus according to claim 21 further including means for releasably locking said trigger.

23. Apparatus according to claim 22 further including means for releasing said locking means.

24. Apparatus according to claim 18 wherein said means for releasing said locking means includes a second activating member mounted to and projecting from said housing for operating said releasing means, said second activating member and said releasing means being connected so that said second activating member causes said releasing means to unlock said trigger when said second activating member is moved inwardly of said housing.

25. Apparatus according to claim 24 further including spring means opposing unlocking of said trigger.

26. Apparatus according to claim 24 wherein said first and second activating members are rods.

27. Apparatus according to claim 26 comprising an extension at said first end of said housing, and further wherein said rods are slidably disposed in and normally project from said extension.

28. Apparatus according to claim 26 wherein said extension defines a guideway for said hammer and has a flat end surface that extends at a right angle to the longitudinal axis of said cylinder, and further including an opening in said flat end surface communicating with said guideway and holes in said flat end surface through which said rods normally project from said extension.

29. In a pneumatic apparatus for impacting a fastener or other article comprising a cylinder having first and second ends, means closing off the first end of said cylinder and defining an opening, an impacting means including a member slidably disposed in said opening and a piston connected to said member and reciprocally mounted within the cylinder for driving the impacting means through a drive stroke and a return stroke, sealing means surrounding said member for preventing leakage of air from said first end of said cylinder via said opening while allowing said member to move axially with said piston, an air reservoir, an air manifold chamber connected to the air reservoir, a quick-acting poppet valve for rapidly admitting high pressure air on command to the second end of the cylinder from the air reservoir, and a first control valve adapted (a) to transmit high pressure air to the poppet valve from the air manifold so as to cause the poppet valve to close off the second end of the cylinder or (b) to exhaust high pressure air from the poppet valve so as to cause the poppet valve to open, the improvement comprising a second control valve adapted to (a) transmit high pressure air from the air reservoir to the first end of the cylinder so as to cause the piston to retract the impacting means when the poppet valve is closed, or (b) exhaust air from the first end of the cylinder so that admittance of high pressure air to the second end of the cylinder by opening of the poppet valve will cause the piston to drive the impacting means through its drive stroke.

30. Apparatus according to claim 29 wherein substantially all of the pneumatic energy applied to said piston on opening of said poppet valve is utilized to move said piston and impacting means through said drive stroke, and said poppet and control valves are adapted to cause said impacting means to accelerate progressively over a substantial portion of said drive stroke and to reach its maximum velocity as said piston nears said first end of said cylinder.

31. Apparatus according to claim 29 wherein the impacting means comprises an impacting surface, and further including means for positioning a fastener so that it is engaged and propelled by said impacting surface as the latter is driven through its drive stroke.

32. Apparatus according to claim 29 further including a trigger for operating said first control valve, means for mounting said trigger in operative relation with said first control valve, and means for releasably locking said trigger.

33. Apparatus according to claim 32 further including means for causing said locking means to be released when the apparatus is engaged with a workpiece.

34. Apparatus according to claim 29 further including an end means closing off the bottom end of the cylinder and defining first and second openings communicating with the interior of said cylinder, and further wherein the impacting member is movable lengthwise through said first opening and said second control valve is connected to said second opening.

35. Apparatus according to claim 29 wherein said second control valve comprises a first port leading to said air reservoir, a second port leading to the bottom end of said cylinder, and a third port leading to the atmosphere, and a control valve member movable so as to selectively close off said first or third ports.

36. Apparatus according to claim 35 wherein said second control valve is disposed so that when said cylinder is oriented vertically with said poppet valve located above said piston, gravity will urge said control valve member to move into a position where it will close off said third valve port.

37. Apparatus according to claim 35 wherein said second control valve is arranged so that the air pressure in said air reservoir biases its control valve member in a direction to close off said third port.

38. Apparatus according to claim 35 further including means for shifting the control valve member of the second control valve in a direction to close off its first port and open its third port, said means for shifting the control valve member of the second control valve comprising an actuating member mounted to and projecting from a housing which forms part of said apparatus, and means connecting said actuating member and the control valve member of the second control valve for shifting that control valve member in a direction to close off the first port of said second control valve when said actuating member is forced inwardly of the housing.

39. Apparatus according to claim 35 wherein the control valve member of said second control valve is incapable of closing off the second port of said second control valve.

40. Apparatus according to claim 29 wherein said first and second control valves have orifices communicating with said air manifold and air reservoir respectively which are characterized by the fact that the orifice of the second control valve has a larger effective cross-sectional area than the orifice of the first control valve.

41. Apparatus according to claim 40 wherein the effective cross-sectional areas of the first and second control valve orifices are in a ratio of about 1:4.

42. Apparatus according to claim 29 further including a hollow housing, with said cylinder disposed within and subdividing the interior of the hollow housing into a first chamber which is located between the housing and the cylinder and forms said air reservoir and a second chamber within the cylinder, and further wherein said housing has an exhaust port and said second control valve is disposed so as to selectively connect the lower end of said second chamber with said first chamber or said exhaust port.

43. In a pneumatic apparatus for impacting a fastener or other article comprising a cylinder, an impacting member, a piston connected to the impacting member and reciprocally mounted within the cylinder for driving the impacting member through a drive stroke and a return stroke, an air reservoir, an air manifold chamber connected to the air reservoir, a quick-acting poppet valve for rapidly admitting high pressure air on command to the upper end of the cylinder from the air reservoir, and a first control valve adapted (a) to transmit high pressure air to the poppet valve from the air manifold so as to cause the poppet valve to close off the upper end of the cylinder or (b) to exhaust high pressure air from the poppet valve so as to cause the poppet valve to open, the improvement comprising a second control valve adapted to (a) transmit high pressure air from the air reservoir to the lower end of the cylinder so as to cause the piston to retract the impacting member when the poppet valve is closed, or (b) exhaust air from the underside of the piston so that admittance of high pressure air to the upper end of the cylinder by opening of the poppet valve will cause the piston to drive the impacting member through its drive stroke, an end member defining a guideway for said impacting member, said end member having an end surface and a fastener discharge opening in said end surface at the end of said guideway, and an operating member for said second control valve supported by said end member and arranged to protrude from said end member when said second control valve is set to transmit high pressure air from the air reservoir to the lower end of the cylinder, said impacting member having a length such that it protrudes from said fastener discharge opening when it is at the end of its drive stroke.

* * * * *

UNITED STATES PATENT OFFICE
CERTIFICATE OF CORRECTION

PATENT NO. : 4040554
DATED : August 9, 1977
INVENTOR(S) : Harry M. Haytayan

It is certified that error appears in the above-identified patent and that said Letters Patent are hereby corrected as shown below:

Column 11, line 35, "75 psig" should be -- 175 psig --.

Column 11, line 36, "how" should be -- now --.

Column 13, line 18, after "dissipation", "or" should be -- of --.

Signed and Sealed this

Fifteenth Day of November 1977

[SEAL]

Attest:

RUTH C. MASON
Attesting Officer

LUTRELLE F. PARKER
Acting Commissioner of Patents and Trademarks